(12) United States Patent
Ngoi et al.

(10) Patent No.: US 6,710,881 B1
(45) Date of Patent: Mar. 23, 2004

(54) HETERODYNE INTERFEROMETRY FOR SMALL SPACING MEASUREMENT

(75) Inventors: Bryan Kok Ann Ngoi, Singapore (SG); Krishnan Venkatakrishnan, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 09/407,177

(22) Filed: Sep. 28, 1999

(51) Int. Cl.$^7$ ............................................... G01B 9/02
(52) U.S. Cl. ...................................... 356/487; 356/507
(58) Field of Search ............................... 356/485, 486, 356/487, 507

(56) References Cited

U.S. PATENT DOCUMENTS

| | | | |
|---|---|---|---|
| 4,606,638 A | | 8/1986 | Sommargren ............... 356/351 |
| 4,762,414 A | * | 8/1988 | Grego ........................ 356/485 |
| 5,218,424 A | | 6/1993 | Sommargren ............... 356/358 |
| 5,600,441 A | * | 2/1997 | de Groot et al. ............ 356/492 |
| 5,751,427 A | | 5/1998 | de Groot .................... 356/358 |
| 5,831,733 A | * | 11/1998 | de Groot .................... 356/369 |
| 5,953,125 A | * | 9/1999 | de Groot .................... 356/492 |

* cited by examiner

Primary Examiner—Frank G. Font
Assistant Examiner—Andrew H. Lee

(74) Attorney, Agent, or Firm—Burns, Doane, Swecker & Mathis, LLP

(57) ABSTRACT

A system and method for high speed and precision measurement of the distance between at least two near contact surfaces using heterodyne interferometry is disclosed. One of the surfaces is an optically transparent element and the other surface is a substantially non-transparent element. A laser source produces an output having two superimposed orthogonally polarized beams having S and P polarization, with a frequency difference between them. The polarized beams are split into measurement and reference beams without altering the characteristics of the polarized beams. The reference beams are caused to interfere, and a reference photo detector detects the reference beams and provides a reference signal. The measurement beam strikes the object of interest at an oblique angle after passing through a glass plate having a polarization coating on the bottom surface close to the object of interest. The oblique angle is such that the S polarization of the incident beam is reflected from the bottom surface of the polarization coated glass plate and the P polarization refracts through the glass plate. The P polarization reflects from the substantially non-transparent object of interest and refracts to the glass plate. The reflected S and P polarization beams from the bottom surface of the glass plate and the surface of the object are made to interfere. A measurement photo detector detects the measurement beams and provides a measurement signal. The distance between the bottom surface of the glass disk and the object surface based on the phase deference between the measurement and reference signals is determined from the measurement and reference photo detectors.

28 Claims, 16 Drawing Sheets

HETERODYNE INTERFEROMETRY FOR SMALL SPACING MEASUREMENT

FIELD OF THE INVENTION

This present invention relates to high-speed, high precision measurement of the distance between two near contact surfaces one of which is an optical transparent element. In particular the invention relates to an apparatus and method for performing this measurement using a heterodyne interferometer. Moreover, this invention relates to an optical interferometer for measuring the flying height of a magnetic head.

BACKGROUND OF THE INVENTION

In magnetic data storage, there is a requirement for measuring the flying height of the slider assembly which is in near contact with a high-speed rotating disk in order to optimize the performance of the slider assembly. The flying height is the distance between the magnetic head pole and the surface of the rotating magnetic disk. Recently, the rapid increase in recording density has caused a continuous reduction in the flying height. The flying height is generally less than 250 nm depending on the design of the slider. The trend is toward an ultra-low flying height which is less than 25 nm.

Optical Flying Height Testing (OFHT) is the most popular testing technique in the field. OFHT are almost invariably based on interferometry. There are two known methods. The first method is measuring the flying height from a real magnetic disk through the backside of the slider. The second method is measuring the disk-slider spacing directly, using a transparent disk to replace the magnetic disk. The first method is not popular due to the fact that the accuracy of the measurement depends on the uniformity of the thickness of the slider. Moreover, the backside of the slider is not accessible on most production slider assemblies. Currently, the second method is more widely used in commercial applications.

Until now, there were three types of interferometry developed for flying height testing. The three types include white light interferometry, three-wavelength interferometry, and monochromatic interferometry. With a white light interferometer, a flying height of 700 to 300 nm can be detected accurately. Three-wavelength interferometer is an extension of white light interferometer. A flying height of less than 250 mm can be measured with a three-wavelength interferometer with acceptable errors. Both a white light interferometer and a three-wavelength interferometer are subject to multi-reflections in the disk-slider air bearing, which produces errors. When the flying height is reduced to 50 nm, the error caused by multi-reflections cannot be neglected. Therefore, the polarization interferometer was developed to measure ultra-low flying height.

In U.S. Pat. No. 4,606,638, Sommargren proposed a polarization phase modulated Fizeau interferometer in which the reference surface is the front surface of a plate polarizer. The modulated interference pattern is detected by a CCD array. The signal provides the absolute distance between the reference surface and the flying slider. Although this technique was an advance in providing the flying height, pitch angle and roll angle in a single measurement, it is not practicable because the measurement accuracy is dependent on the flatness of the glass disk surface which acts as a plate polarizer.

In U.S. Pat. No. 5,218,424, Sommargren proposed a polarization interferometer. In a polarization interferometer, a coherent, single wavelength, linearly polarized beam passes through a phase shifter which varies the relative phase of the orthogonal polarization components of the beam by 0, $\pi/2$, $\pi$, $3\pi/2$. Then the beam is directed to the glass disk at a Brewster's angle. The polarized beam P will pass through the glass disk and strike the slider without being reflected from glass disk surface. While the S polarized beam will be reflected by each glass-air interface. Therefore, the S polarization beam can be used as the reference beam and the phase difference between S and P polarization beams carries the flying height information. The phase change which is caused by the optical path difference between S and P polarization beams, therefore, can be determined by a four-step algorithm. By using the polarized laser beam, the error caused by multi-reflection is completely eliminated. Thus, the apparatus is capable of measuring extremely small gaps. Despite the advantage, this technique has some significant limitations, including the use of a very expensive complicated, high speed phase modulator. Moreover, the data processing rate is quite slow, around 15 HZ, which is not suitable for commercial applications.

In U.S. Pat. No. 5,660,441, Groot proposed a quad-beam polarization interferometer. Three of the four beams are S polarization, the other one is a P polarization. These four beams are parallel to each other and are directed to the glass disk at Brewster's angle. Except for the P polarized beam passing through glass disk without reflection, all the beams are reflected back from the surface of the glass disk. After being reflected from the slider ABS, the P polarized beam again passes through the glass disk. The two reflected S polarized beams are made to interfere thereby providing a reference. The P polarized beam is made to interfere with the remaining S polarized beam. Thus, the interfered beam contains the flying height information. The spacing between disk surface and slider ABS can be detected by comparing the two interfered beams. The main advantage of this technique is that it eliminates the phase modulator which was used by all the prior-art techniques. Therefore, the signal-processing rate can be very fast, and the error introduced by the phase shifting can be eliminated. This apparatus is capable of measuring ultra-low flying height with the required accuracy. In U.S. Pat. No. 5,751,427, Groot further improved his polarization interferometer by using a single linearly polarized beam.

All these prior art techniques are based on homodyne interferometry, using phase measurement to find out the flying height by detecting the optical path difference between reference beam and measurement beam. One phase measurement method, which is generally employed in all these prior art techniques, is the four-step algorithm. This method is subject to the intensity variation of the laser beam, which may be caused by an unstable laser source, birefringence of the high-speed rotating glass disk, disturbances from the surroundings, etc. Moreover, the reflection of the slider ABS will introduce a phase change in the measurement beam which strikes it. In the prior art technique, this phase change was assumed to be $\pi$. These will cause flying height measurement errors as large as 10 nm. It is acceptable when the flying height is above 250 nm. When flying height is reduced to less than 50 nm, it is necessary to precisely measure the phase change introduced by the ABS reflection. Usually, the correction of the phase change occurring at the ABS will be done by a measurement instrument independent of the flying height tester which is called an ellipsometer. The correction of the ABS reflection phase change is substantial disadvantage of all the prior art techniques.

Although Groot integrated the ABS reflection phase change correction with the flying height testing into one instrument in his U.S. Pat. No. 5,757,427, the correction is still a separate measurement step that has to be done before the gap measurement.

SUMMARY OF THE INVENTION

Thus, the objective of the present invention is to provide an apparatus and method capable of measuring the flying height by removing various uncertainties in an OFHT using heterodyne interferometry without requiring any extra measurement other than flying height testing. The embodiment of the present invention has a laser source emitting two orthogonally polarized beams of different frequency by using a Zeeman laser source or by using an acousto optic modulator and recombining the beam by using optical components. The beam is sally filtered and expanded in diameter by using a spatial filter, by using a pinhole, or with optical fibers. The beam is made to strike the object at a single point or to scan on the object by using acousto optic deflector. The embodiment of the present invention has means to obtain parallel scanning beam and to focus the scanning beam on a single plane. The beam is divided in to two, one for the reference path and the other for the measurement path. The measurement beam strikes the glass disk at an oblique angle such that the P polarized beam refracts through the glass disk and is reflected from the surface of the object. The S polarization beam is reflected from the bottom surface of the glass disk. The reflected S and P polarized beams from the bottom surface of the disk and the object surface are made to interfere on the measurement photo detector. The reference beams are made to interfere at the reference photo detector. Upon comparison of the phase change between the reference and the measurement signal, the displacement and the distance between the disk surface and the object can be obtained using a phase meter and adopting heterodyne interfrometric principles. The reference signal can also be obtained by reflection from the surface of the object or the bottom surface of the glass disk by directing the beam at a particular oblique angle.

The second embodiment of the present invention is a means to measure an object surface smaller than the focused spot size of the beam by using a diaphragm before the measurement photo detector to allow a smaller portion of the interfered beam to pass through it. The smaller the diameters of the diaphragm or slot results in a smaller object being measured in the focused spot size.

DETAILED DESCRIPTION OF THE INVENTION

Figure 1:
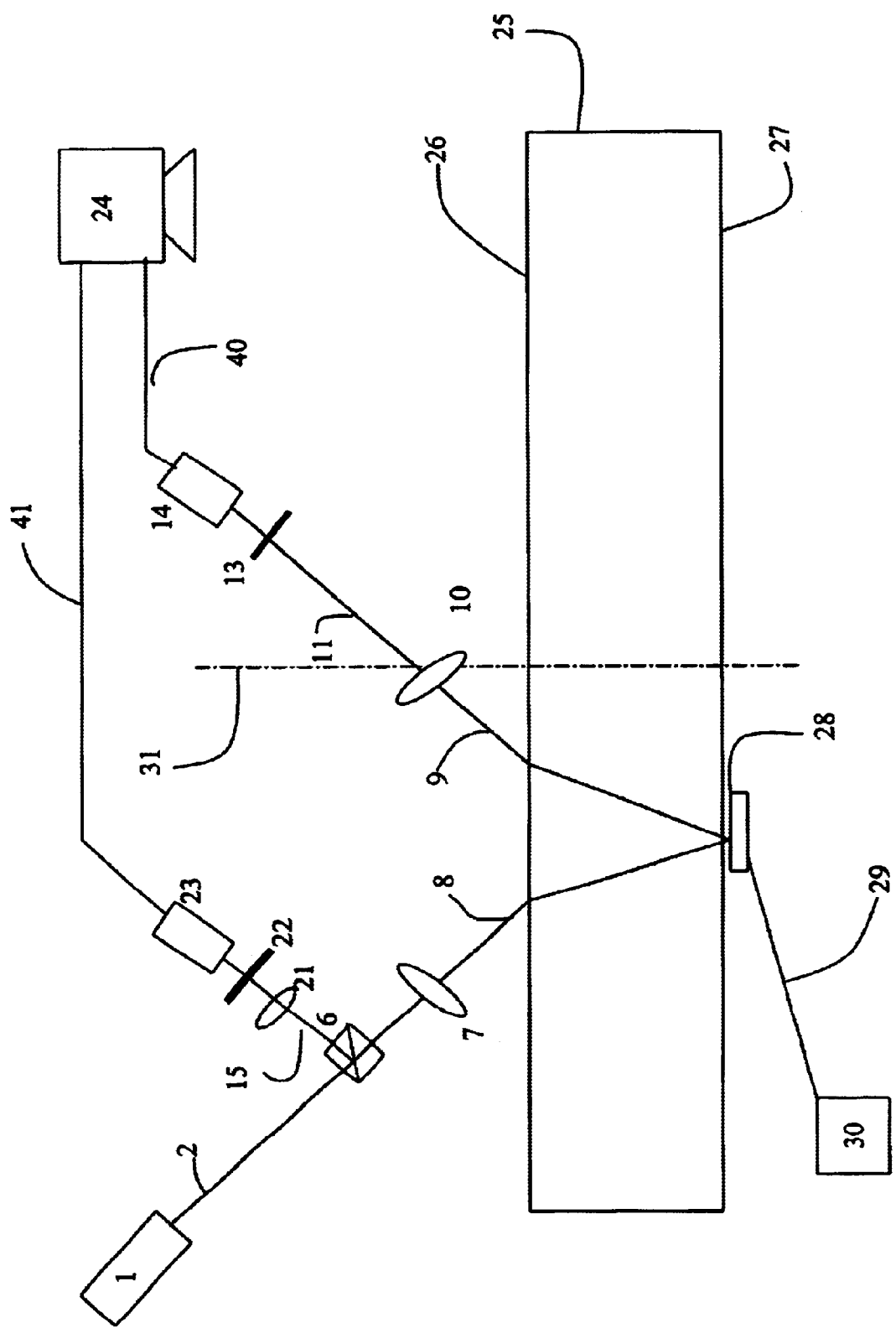
FIG. 1 is a drawing showing a preferred embodiment of the invention setup to measure the distance of a flat object surface with respect to the surface of a rotating transparent disk using a stationary measurement beam and a reference beam taken directly from light source.
Figure 15:
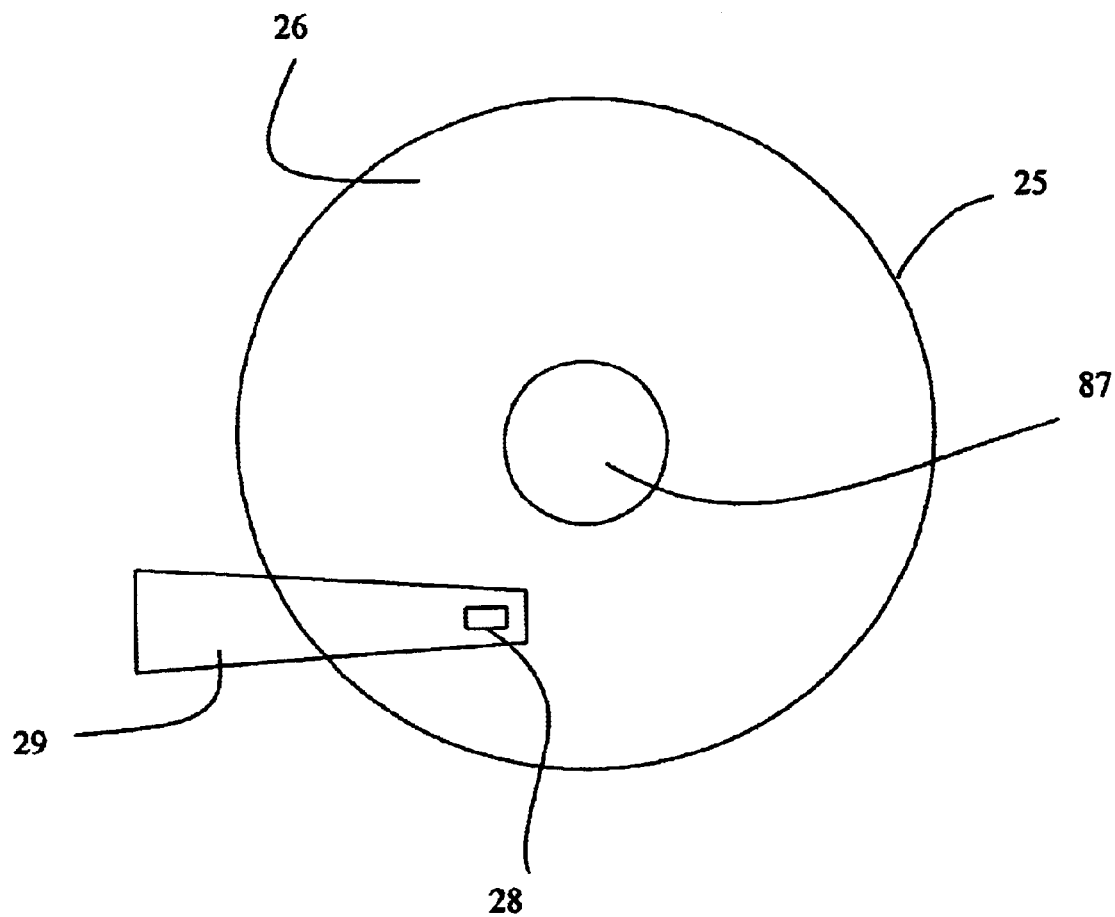
FIG. 15 is a drawing showing the top view of the object with reference to the rotating glass disc.

FIG. 1 shows a preferred embodiment of the invention employing an interferometry setup for measuring the distance of an object 28 surface that is nearly in contact with a surface 27 of a rotating transparent disk 25. The apparatus in this embodiment is preferably suited to the prediction of the aerodynamic flight characteristics of a conventional slider 28 over the surface of a rotating magnetic storage medium. A spindle drives disk 25. The size of the gap may be determined as a function of the speed of the rotating disk 25. The position of the test object 28 with respect to disk 25 may be further clarified by reference to FIG. 15, which shows top a view of the disk 25, indicating the position of the object 28.

Referring to FIG. 1, the laser beam is preferably obtained from the source 1, which provides a smooth laser beam 2 which contains two orthogonally polarized laser beams having a frequency difference between them. Source 1 can be of the type shown in FIG. 2A or 2B, which will be explained in later sections. Non-polarization beam splitter 6 will split the beam 2 into two parts. The beam 15, the reference beam, passes through focusing lens 21 and interferes on passing through a polarizer or analyzer 22, falling on photodetector 23. The interferometric signal, reference signal 41 is sent into phasemeter 24. This optical path is used as a reference path for the flying height tester. The other optical path, which passes through beam splitter 6, is used as a measurement path. Focusing lens 7 focuses the wavefront 8 on to the air bearing surface (ABS) of the slider 28.

Figure 4:
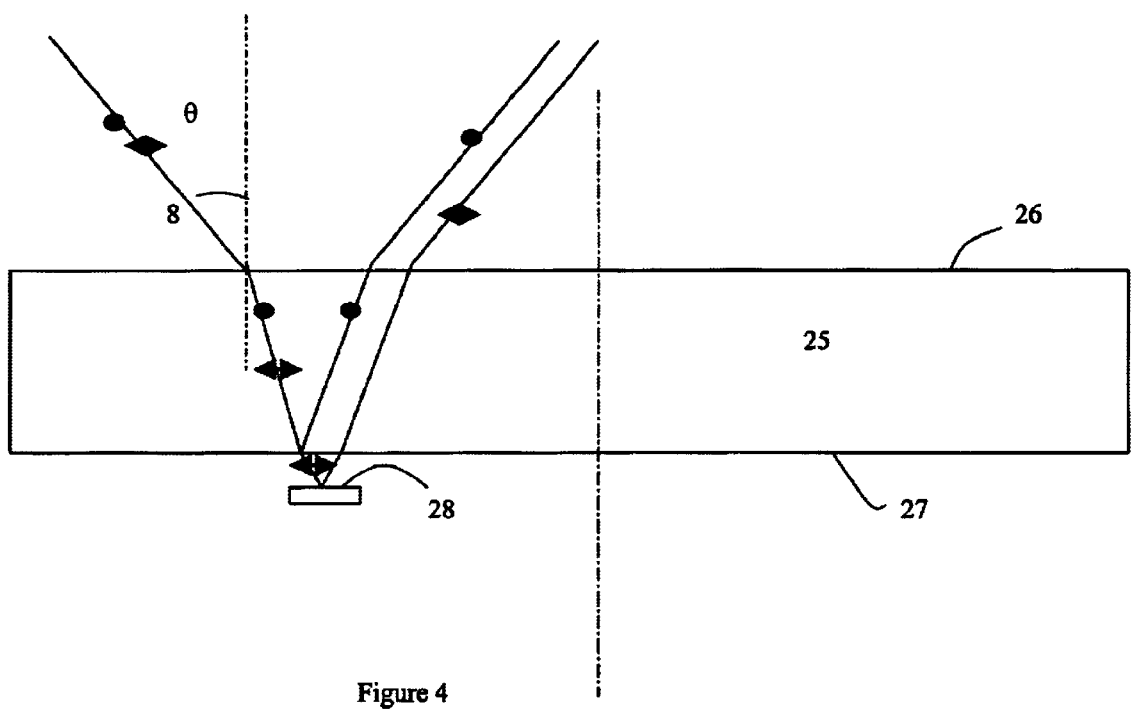
FIG. 4 is a drawing illustrating the working principles of the preferred embodiment of the invention using a glass disk having polarization coating on its side closest to the object surface.

FIG. 4 illustrates the working principles of the optical element 25. Optical element 25 is a transparent disk, which transmits wavefront 8. Surfaces 26 and 27 are plano and parallel. Surface 26 has an antireflection coating so that essentially all of piano wavefront 8 is refracted onto disk 25 and essentially none of wavefront 8 is reflected by the surface 26. Surface 27 of disk 25 is coated so that it is a surface polarizer. Therefore, when wavefront 8 is incident on the disk surface at an oblique angle θ, the surface 27 transmits the P polarization component and reflects the S polarization component of wavefront 8. Thus, surface 27 acts as the reference surface for the flying height tester. The S polarization wavefront reflected back by surface 27 passes through transparent disk 25 and is refracted by surface 26. The P polarization component of wavefront 8 is refracted by surface 27 and falls on the air bearing surface (ABS) of the slider 28. It is then reflected back from the ABS, goes through transparent disk 25 and is refracted by surface 26.

Figure 5:
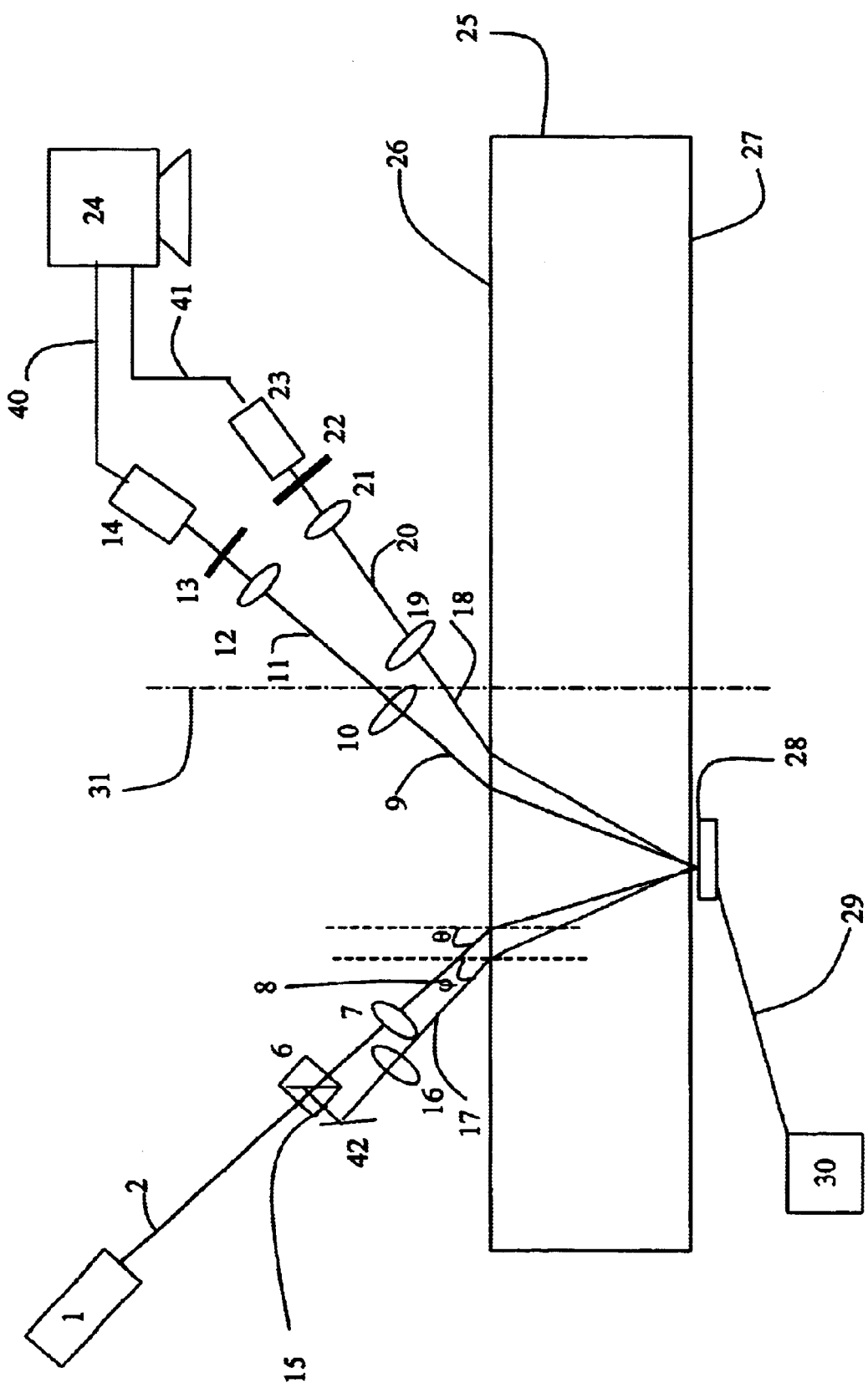
FIG. 5 is a drawing showing a preferred embodiment of the invention setup to measure the distance of a flat object surface with respect to the surface of a rotating transparent disk using a measurement beam and a reference beam which strike the bottom surface of the disk or the object surface at the same point but at a different angle.

Referring to FIG. 5 since the disk-slider spacing is very small, the S and P polarization component of wavefront 8 will merge again when they are refracted by surface 27, forming wavefront 9. Focusing lens 10 collimates the beam 9 into beam 11. Focusing lens 12 focuses the beam 11 into the photodetector 14, after passing through polarizer or analyzer 13, where the beam interferes. The interferometeric signal 40, the measurement signal 41 is sent into phasemeter 24. The output signal of phasemeter 24 represents the phase difference between reference beam 15 and measurement beam 9.

In order to get the absolute flying height of the slider 28, a zero flying height has to be defined before the measurement. First, slider 28 is loaded, and made to contact with surface 27. Then, the transparent disk 25 starts rotating. At the same time, the phasemeter 24 starts counting the phase difference between signal 41 and 40. The phase difference obtained when the disk rotates at a very low speed gives the zero flying height. The phase difference obtained when the disk rotates at a full speed gives the flying height. From the phase change, the displacement of the slider can be derived from formula:

$$\Delta\phi = \left(\frac{2\pi}{\lambda}\right) 2h \cos\theta$$

where h is the spacing between disk surface 27 and ABS of slider 28. θ is the incident angle of beam 8, and λ is the wavelength of the laser beam.

Figure 2A:
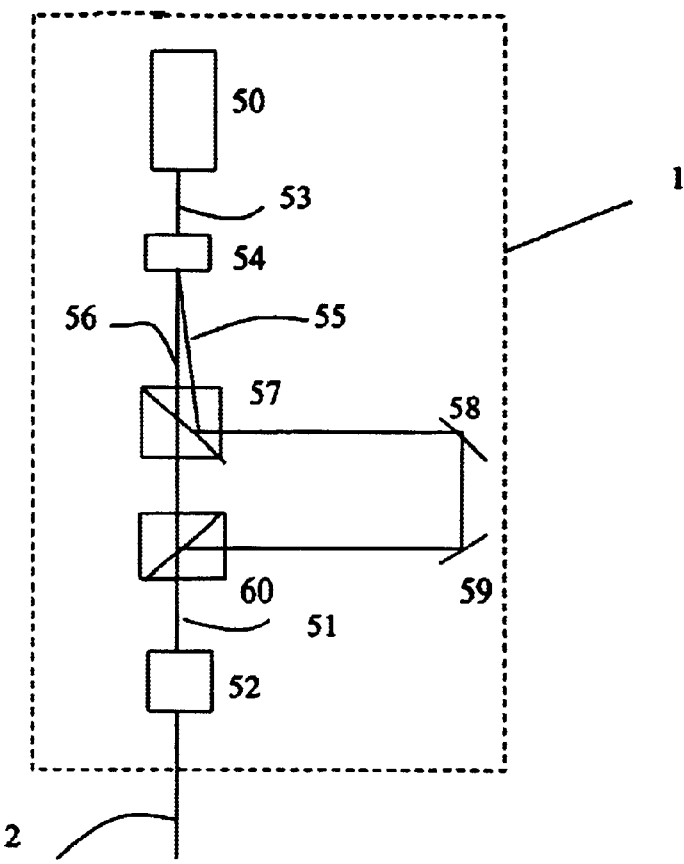
FIGS. 2A and 2B are drawings showing setups to produce two orthogonally polarized beams with a frequency difference between them and to superimpose the two beams.

Referring to FIG. 2A, the linearly polarized beam 51 having a frequency of $f_o$ from the laser source 50 will expand in diameter as well as be smoothened after passing through a spatial filter 52. The beam 53 passes through acousto-optical modulator 54. When beam 53 is incident on the acousto optic modulator 54 at Bragg's angle, two orthogonally polarized beams, zero order beam 56 and the first order beam 55 having a frequency difference between them, are obtained at the output aperture of 54. In FIG. 2A, beam 55 has S polarization while beam 56 has P polarization. The frequency of beam 55 is modulated as $f_o + f_c$, where $f_c$ is the center frequency of acousto-optical modulator 54 and $f_o$ is the frequency of the laser beam 53. The frequency of beam 56 will remain the same as inital beam 53. Since beams 55 and 56 have orthogonal polarization, when they pass through a polarized beam splitter 57, beam 55 will be deflected, and beam 56 will pass through. The beam 56 is then directed into another polarized beam splitter 60 and passes through it. The deflected beam 55 will be directed into polarized beam splitter 60 by mirror 58 and 59. The beam splitter 60 and the deflecting mirror 58 or 59 are aligned such that the beams 55 and 56 merge together, forming beam 2. After obtaining beam 2, the beam can also be filtered.

Figure 2B:
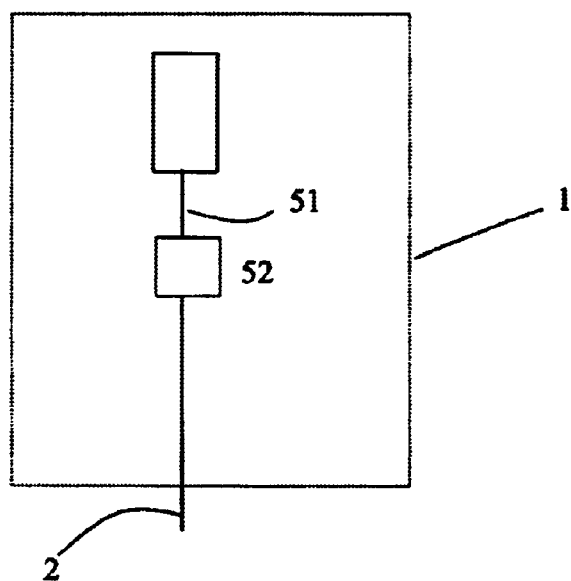

Another preferred embodiment of source 1 is shown in FIG. 2B. Here the laser source 50 is a Zeeman laser generator. A Zeemam laser generator provides a linearly polarized beam 51, where there is a frequency difference between the two orthogonally polarized beams. Beam 51 is led into spatial filter 52. At the output of 52, a laser beam is obtained having the same characteristics of beam 2.

Figure 3A:
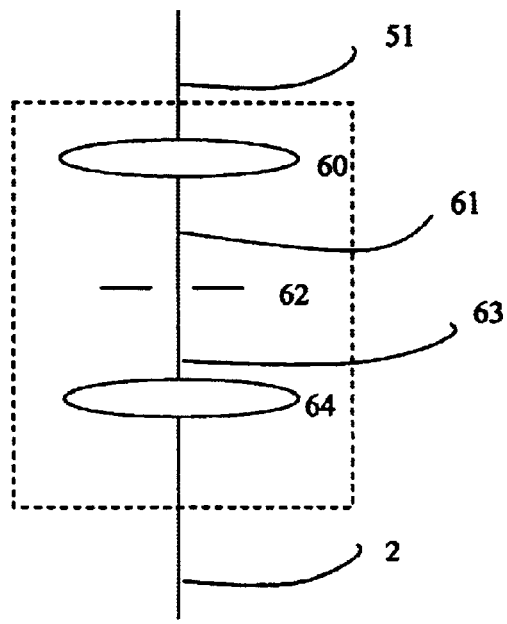
FIGS. 3A and 3B are drawings showing the optical setup and working principles of a spatial filter.
Figure 3B:
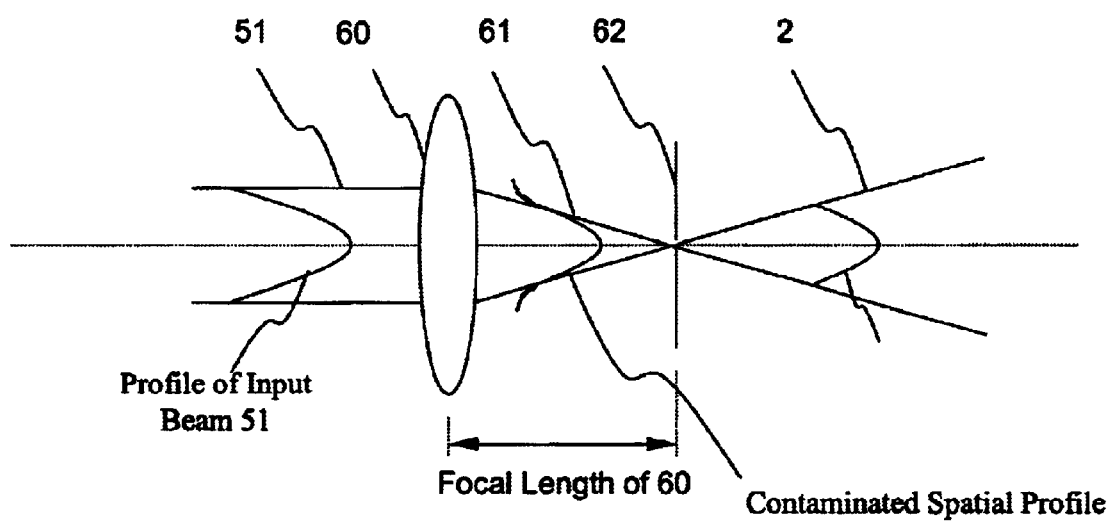

FIG. 3A is the typical structure of a spatial filter. Objective lens 60 focuses the laser beam 51 into a tiny spot in the micro meter range. Pinhole 62 acts as a filter, filtering the spatial noise contained in the laser beam. After passing through the pinhole 62, the scattered beam 61 is smoothened into beam 63. Thus, the diverged beam 63 is collimated by a collimating lens 64. The objective lens and the pinhole are carefully selected so that a smooth beam can be obtained. Once the objective lens has been decided, the diameter of the laser beam 2 is determined by the focal length of collimating lens 64. FIG. 3B illustrates the working principles of the spatial filter. A single mode fibre can be used to replace the pinhole. The fibre has the same function as pinhole, and better filtering effectiveness can be obtained.

The embodiment shown in FIG. 1, takes the reference optical path directly from source 1. Another preferred embodiment is as shown in FIG. 5, where the reference beam is made to pass through an optical path next to that of the measuring beam. As the reference beam and measurement beams travel nearly the same optical path, this embodiment can provide improved measurement accuracy. Non-polarization beam splitter 6 splits the beam 2 into two parts. Wavefront 8 is incident on the disk surface at oblique angle θ, and the surface 27 transmits the P polarization component and reflects the S polarization component of wavefront 8. Thus, the surface 27 acts as the reference surface for the flying height test. The S polarization wavefront reflected back by the surface 27 passes through transparent disk 25 and is refracted by the surface 26. The P polarization component of wavefront 8 is refracted by the surface 27 and falls on the air bearing surface (ABS) of the slider 28. It is then reflected back from the ABS, passes through the transparent disk 25 and is refracted by the surface 26. As the disk-slider spacing is very small, the S and P polarization components of wavefront 8 will merge again when they are refracted by surface 27, thereby forming wavefront 9. Focusing lens 10 collimates the beam 9 into the beam 11. Focusing lens 12 is used to focus the beam 11 on to the photodetector 14, after passing through the polarizer or analyzer 13. The interferometeric signal 40, the measurement signal, is sent into phasemeter 24. Mirror 42 directs the beam 15 into transparent disk 25, striking on the disk surface 26 at an angle $\phi$. Angle $\phi$ is slightly larger or less than oblique angle $\theta$. Therefore, beam 17 will be completely reflected back at disk surface 27 or at the object surface 28, instead of being split into two polarization beams as what happens to the beam 8 which is incident to disk surface 26 at oblique angle $\theta$. Focusing lens 16 having the same specification as the lens 7 focuses beam S into a tiny laser spot on the surface 27 or 28. The alignment of the measurement and reference beams 8 and 17, respectively, are such that they focus on the same point on the surface 27 or 28.

Figure 6:
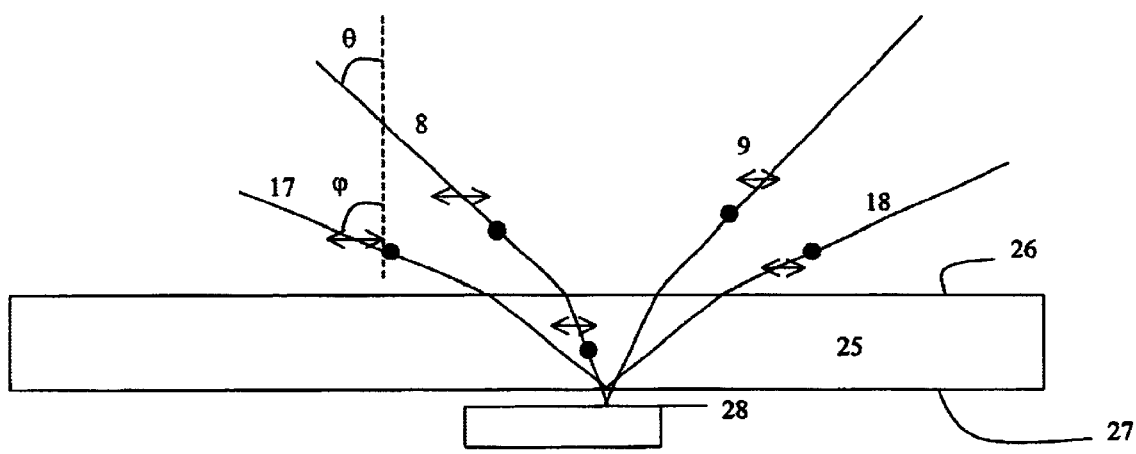
FIG. 6 is a drawing showing the working principles of the preferred embodiment of the invention when the measurement and reference beams strike the bottom surface of the glass disk or the object surface at the same point but at a different angle.

FIG. 6 shows the relationship of the two laser beams and the relative positon of the two laser spots focused from beam 17 and beam 8. After being reflected back completely from surface 27 or 28, beam 17 is refracted by disk surface 26 into beam 18. Focusing lens 19 collimates the beam 18. The lens 21 focuses it into the photodetector 23 after passing through the polarizer or analyser 22, where the two orthogonal polarized components of beam 18 interfere. Interferometric signal 41 is sent into phasemeter 24, serving as the reference signal. As reference the beam passes along an optical path very close to that of the measurement beam, the errors introduced by the high-speed rotating disk, disturbance from external environment, etc., can be compensated effectively.

Embodiments shown in FIGS. 1 and 5, can measure the spacing at a in single position of the slider ABS each time. If the spacing of more than one point is necessary, the slider controller 30 drives the slider 28 accordingly. The measurement step described above has to be repeated at each measurement point.

Figure 7:
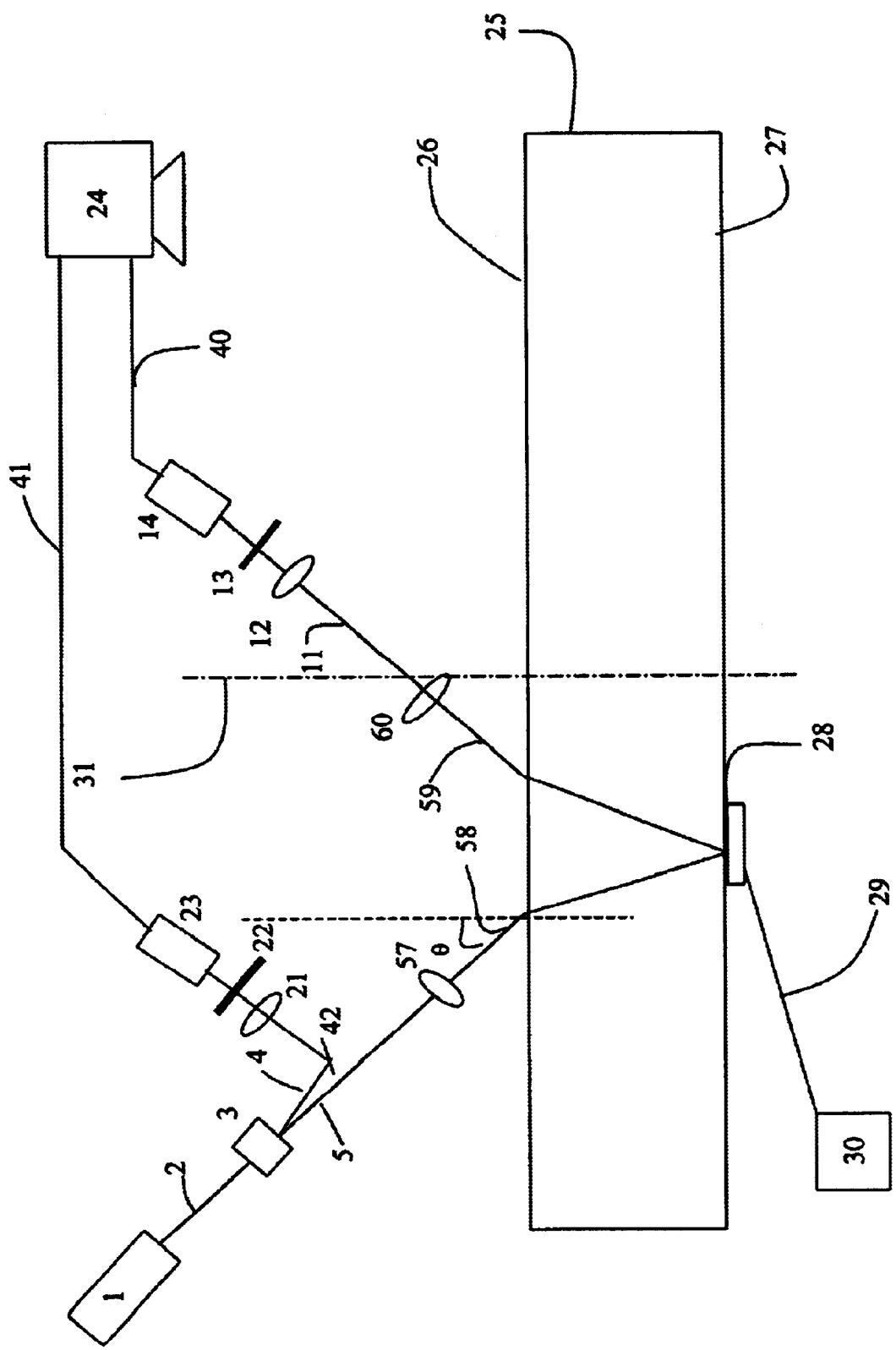
FIG. 7 is a drawing showing a preferred embodiment of the invention setup to measure the distance of a flat object surface with respect to the surface of a rotating transparent disk using a scanning measurement beam and a reference beam taken directly from the light source.
Figure 8:
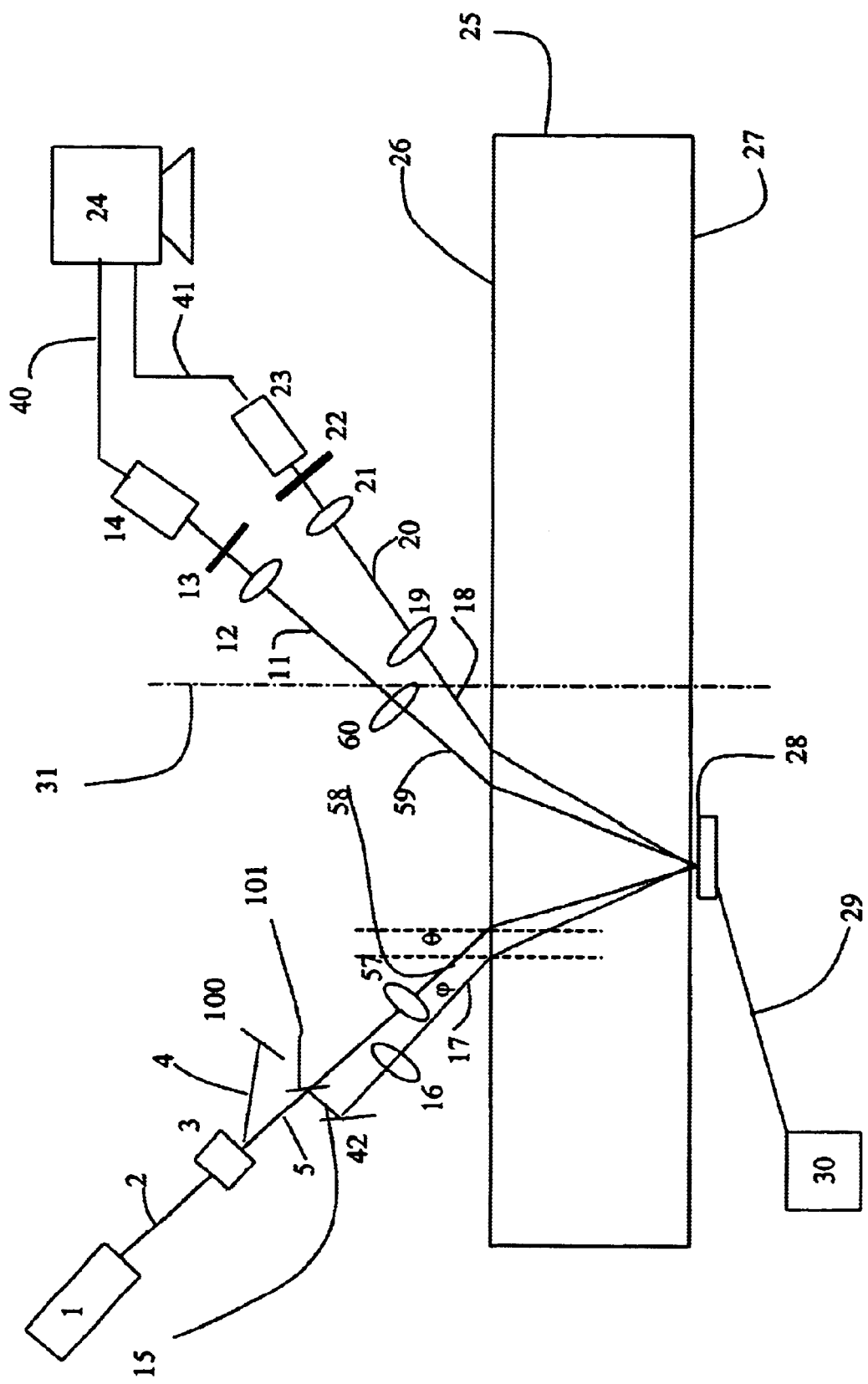
FIG. 8 is a drawing showing a preferred embodiment of the invention setup to measure the distance of a flat object surface with respect to the surface of a rotating transparent disk using a scanning measurement beam and scanning reference beam which strike the bottom surface of the glass disk or the object surface at the same point but at a different angle.

Other preferred embodiments of this invention are illustrated in FIGS. 7 and 8, which provides a beam scanning function that can access any point on the ABS of slider 28 and the rotating glass disk. The optical system and working process of embodiment shown in FIG. 7 is similar to that of the embodiment shown in FIG. 1, except that the polarized beam splitter is replaced by an acousto-optical deflector 3, which can scan the beam in both X and Y axes, and the focusing lens 7 and 10 are replaced by scanning lens or achromatic lens 57 and 60. The crystal of the acousto optic deflector 3 is made such that the input beam to the acousto optic deflector includes both S and P polarization and the output beam includes zero order beam 4 and first order beam scanning beam 5 which both have S and P polarization states. The first order beam 5 from the acousto optic deflector 3 is used as the scanning measurement beam. The zero order beam 4 has the same characteristics as the beam 2. The zero order beam 4 of deflector 3 is directed into focusing lens 21. Beam 4 then passes through polarizer 22 so that the beam interferes and the interference signal 41 is captured by the photo detector 23. The interferometric signal 41, the reference signal detected by photodetector 23, is sent into phasemeter 24. First order beam 5 is focused by scanning lens or achromatic lens 57 on to the object surface 28. Beam 5 strikes the disk surface 26 at oblique angle $\theta$. The incident angle of beam 58 to disk surface 26 is maintained as oblique angle $\theta$ during the scanning.

Figure 9A:
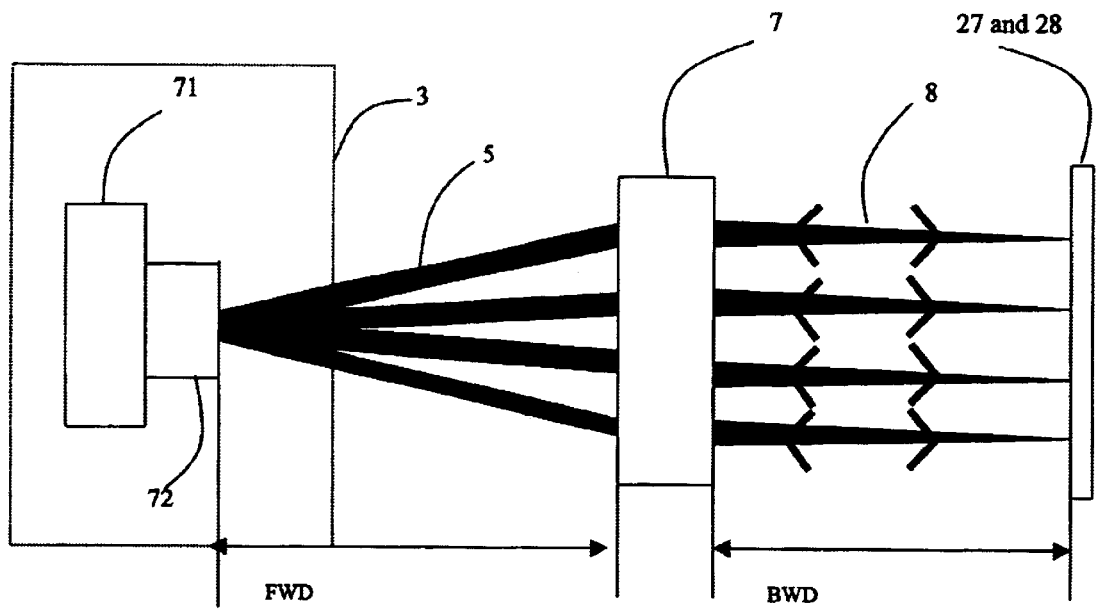
FIGS. 9A and 9B are drawings illustrating the working principles for obtaining a parallel scanning beam by using the combination of an acousto optic deflector, and focusing optics or scanning lens.
Figure 10:
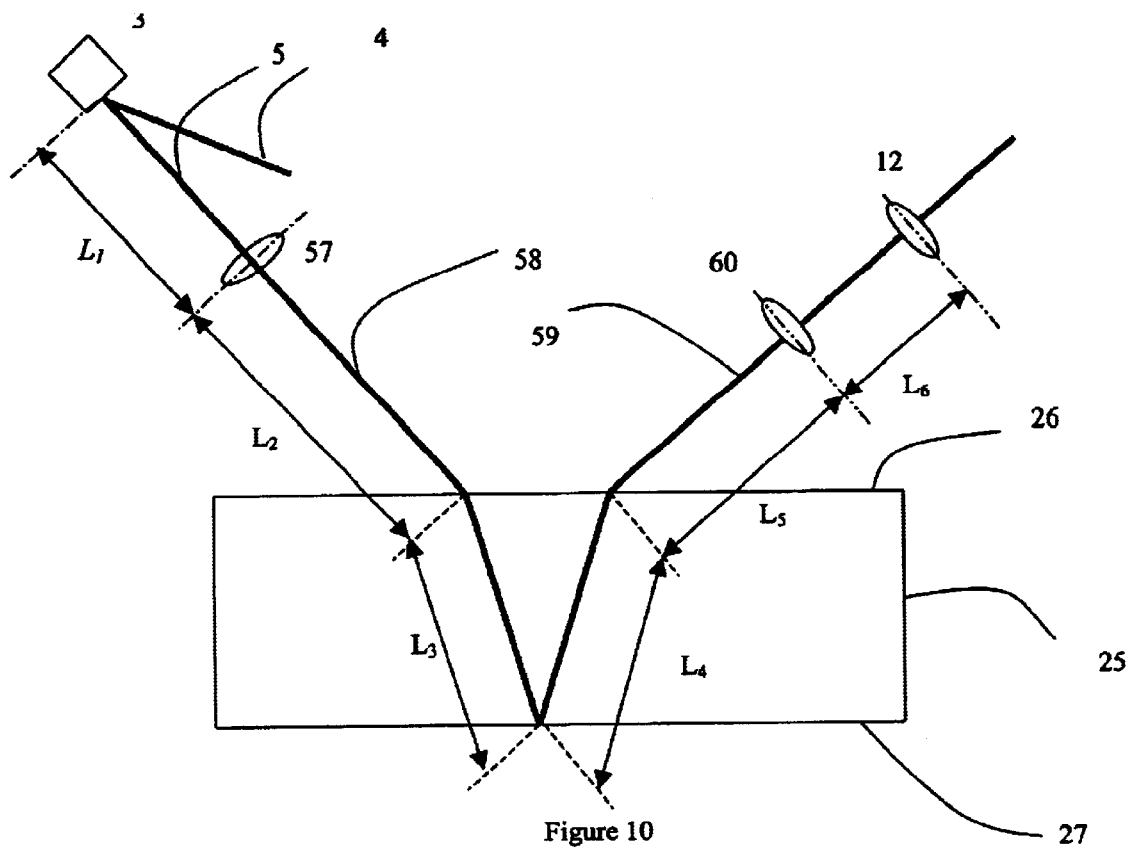
FIG. 10 is a drawing illustrating the relative distance between optical components in the system.

FIG. 9A shows the working principles of the scanning lens. The deflector, scanning lens and the measured target have to be placed according to the forward working distance (FWD) and backward working distance (BWD) of the scanning lens. The scanning lens will make all the scanning beams parallel to each other and focus the scanning beam into a tiny spot. Moreover, the scanning lens makes all the scanning beams focus onto a flat plane, which maintains the measuring spot in focus during the scanning measurement. In this embodiment, the deflector 3, scanning lens 57 and the transparent disk have to be placed according to the forward working distance(FWD) and backward working distance (BWD) of scanning lens 57, as shown in FIG. 10. $L_1$ =FWD of scanning lens 57. $L_2$ +$L_3$ =BWD of scanning lens 57. Beam 58 is refracted by disk surface 26, changed into beam 59. Scanning lens 60 is used to change the diverging beam 59 into collimated beam 11. All the scanning beams converge at a single point, by placing disk surface 27, scanning lens 60 and focusing lens 20 according to the FWD and BWD of the scanning lens 60. As shown in FIG. 10, $L_4$ +$L_5$ =BWD of scanning lens 60, and $L_6$ =FWD of scanning lens 60. If an achromatic or focusing lens is used in place of scanning lens, the FWD and the BWD will be equal to the focal length of the achromatic or focusing lens. If focusing or achromatic lens are used, the position accuracy may not be as accurate as scanning lens. Focusing lens 12 focuses the collimated beam 11 into one small spot falling on to detector 14. Before detector 14, a polarizer causes the two orthogonal polarized components of beam 11 to interfere. Interferometerice signal 40, the measurement signal, from detector 14 is sent to phasemeter 24.

Another preferred embodiment of the scanning flying height tester is shown in FIG. 8. The optical system and working process of FIG. 8 is similar to that of embodiment described in FIG. 7, except that the reference beam is made to scan and pass through an optical path very close to that of the scanning measuring beam. The first order beam 5 from acoustical deflector 3 follows the same optical system as that of the embodiment illustrated in FIG. 7. Zero order beam 4 of the deflector 3 is blocked by a beam blocking mechanism 100. The reference beam is obtained from the scanning first order beam 5 by using a non-polarizing beam splitter 101 and directing the beam into lens 16 with mirror 42. This beam passes through an optical system the same as that of beam 17 described in the embodiment shown in FIG. 5.

FIG. 11 to FIG. 14 show preferred embodiments of the present invention using micro-collimated laser beams. In these embodiments, the beam 102 coming out of source 1 contains two orthogonally polarized laser beams with a frequency difference between them. Moreover, the diameter of beam 102 is in the range of micrometers. Source 1 of the present embodiments are the same as that described in FIG. 2. FIG. 3A shows the layout of a spatial filter. In these embodiment a micro-lens is used as the collimating lens 64. Therefore, a collimated beam with diameter in the range of micrometers can be obtained at the output of spatial filter or fiber optics by using a micro collimating lens.

Figure 11:
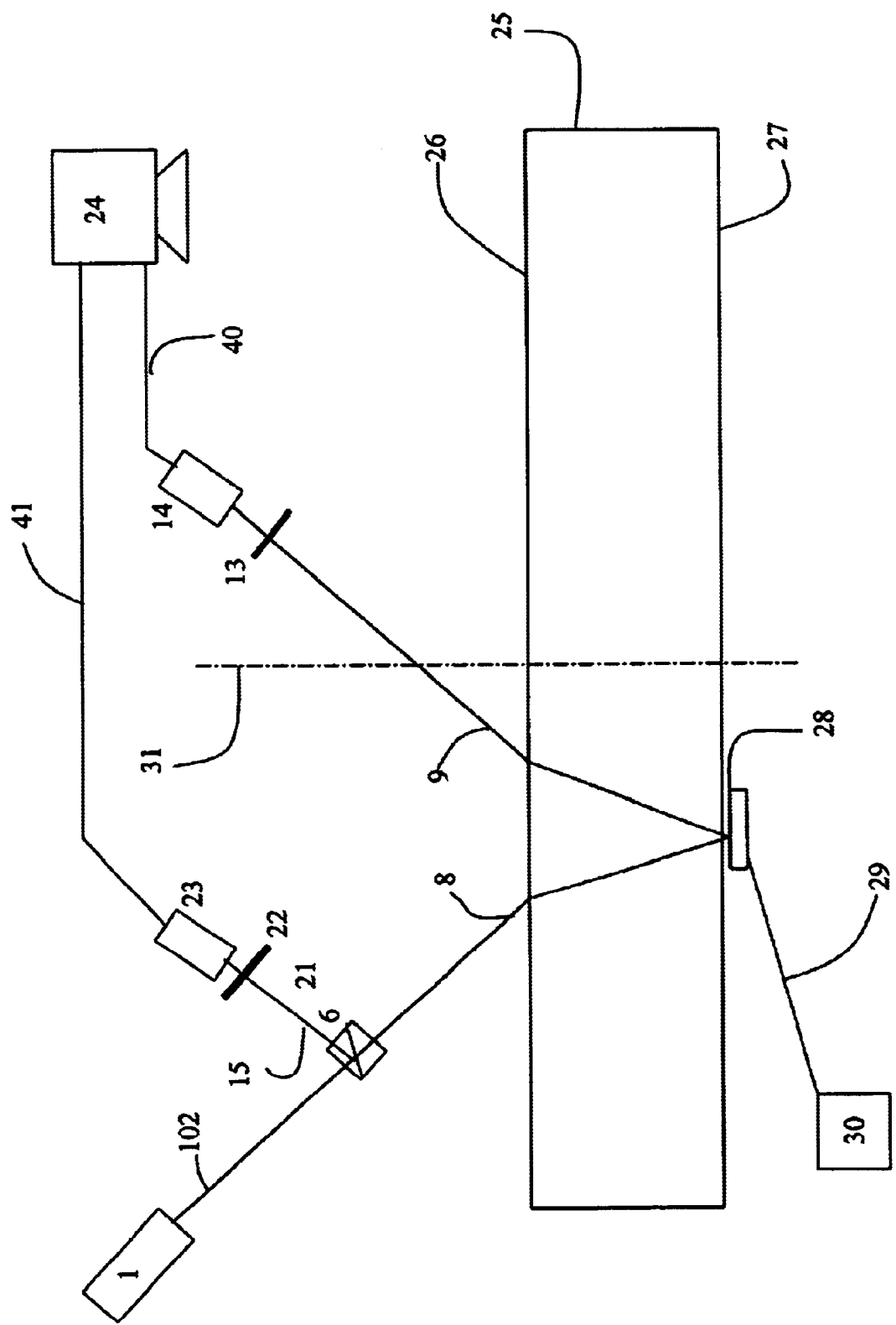
FIG. 11 is a drawing showing a preferred embodiment of the invention setup to measure the distance of a flat object surface with respect to the surface of a rotating transparent disk using a collimated and stationary micro-sized measurement beam and a micro-sized reference beam taken directly from a light source.

Referring to FIG. 11, beam 102 is split into two parts, beam 15 and beam 8 by a non-polarization beam splitter 6. The two orthogonal polarized components of beam 15 are made to interfere by passing through polarizer 22. The interferometric signal 41 detected by photodetector 23 is sent to phasemeter 24. Signal 41 is used as a reference signal. Beam 8 is incident upon the disk surface 26 at oblique angle. The S and P polarization components of the beam 8 are split at disk surface 27. The P polarization component is reflected back by the ABS of slider and S polarization component of beam 8 is reflected back by disk surface 27. The two reflected polarization beams merge when they are refracted by disk surface 26 into beam 9, since the measured spacing is very small. The two orthogonally polarized components of beam 9 are made to interfere by passing through a polarizer 13. The interferometric signal 40 detected by photodetector 14 is sent into phasemeter 24.

Figure 12:
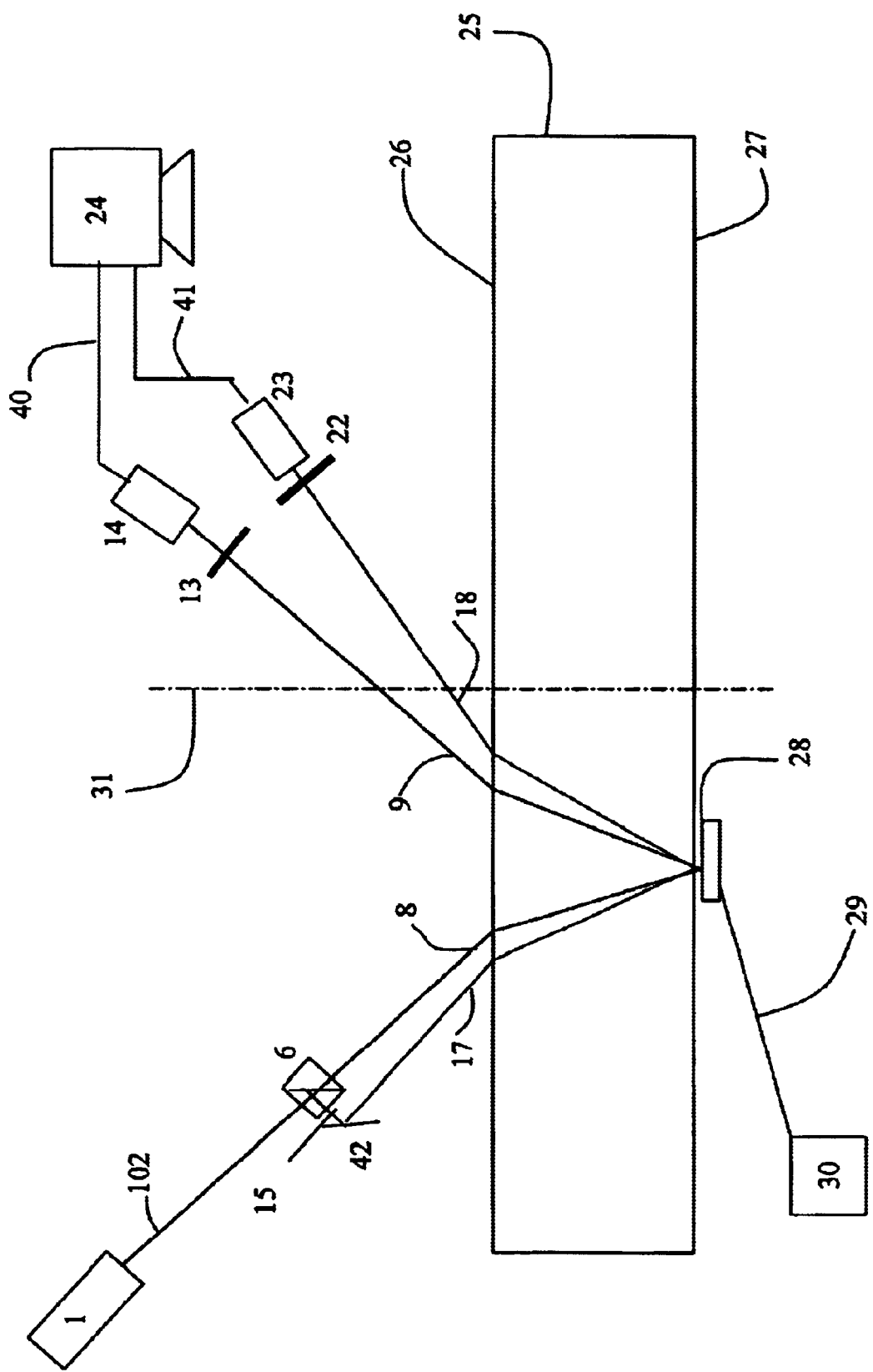
FIG. 12 is a drawing showing a preferred embodiment of the invention setup to measure the distance of a flat object surface with respect to the surface of a rotating transparent disk using a collimated and stationary micro-sized measurement beam and a micro-sized reference beam which strike the bottom surface of the glass disk or the object surface at the same point but at a different angle.

Referring to FIG. 12, beam 102 is split into two parts beam 15 and beam 8 by non-polarization beam splitter 6. Mirror 42 directs the beam 15 into the transparent disk 25, striking the disk surface 26 at an angle $\phi$. Angle $\phi$ is slightly larger or less than the oblique angle $\theta$. Therefore, beam 17 will be completely reflected back at disk surface 27 or at the slider surface 28, instead of being split into two polarization beams as happens to the beam 8 which is incident on disk surface 26 at oblique angle $\theta$. Beam 18 is directed to the photodetector 23 and is made to interfere by passing through polarizer or analyzer 22. The $\theta$ interferometric signal 41, the reference signal detected by photodetector 23, is sent to phasemeter 24. Beam 8 is incident on the disk surface 26 at oblique angle $\theta$. The S and P polarization components of the beam 8 are split at disk surface 27. The P polarization component is reflected back by the ABS of slider and the S polarization component of beam 8 is reflected back by disk surface 27. The two reflected polarization beams merge when they are refracted by disk surface 26 into beam 9, since the measured spacing is very small. The two orthogonally polarized components of beam 9 are made to interfere by passing through a polarizer 13. The interferometric signal 40, the measurement signal detected by photodetector 14, is sent into phasemeter 24.

Figure 9B:
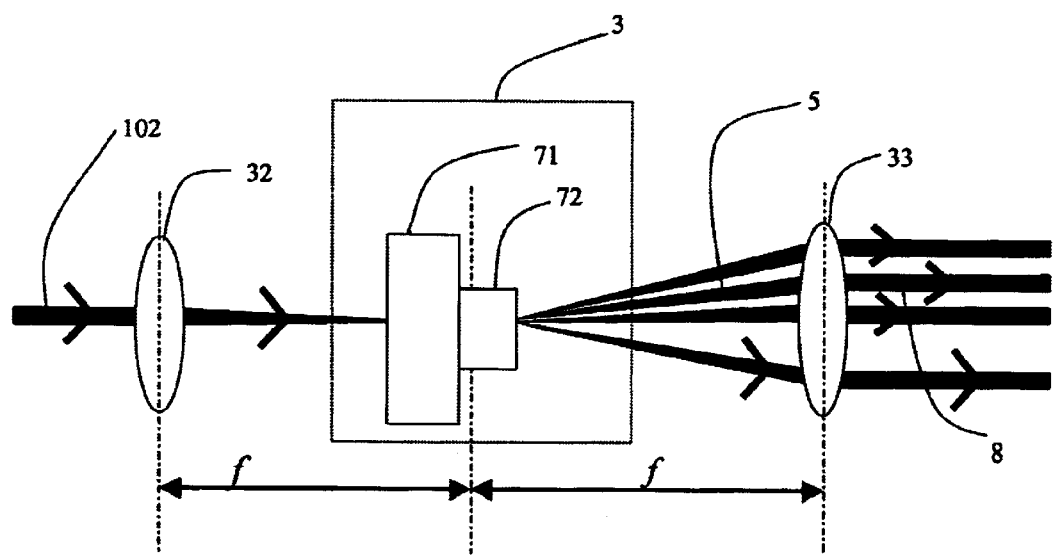
Figure 13:
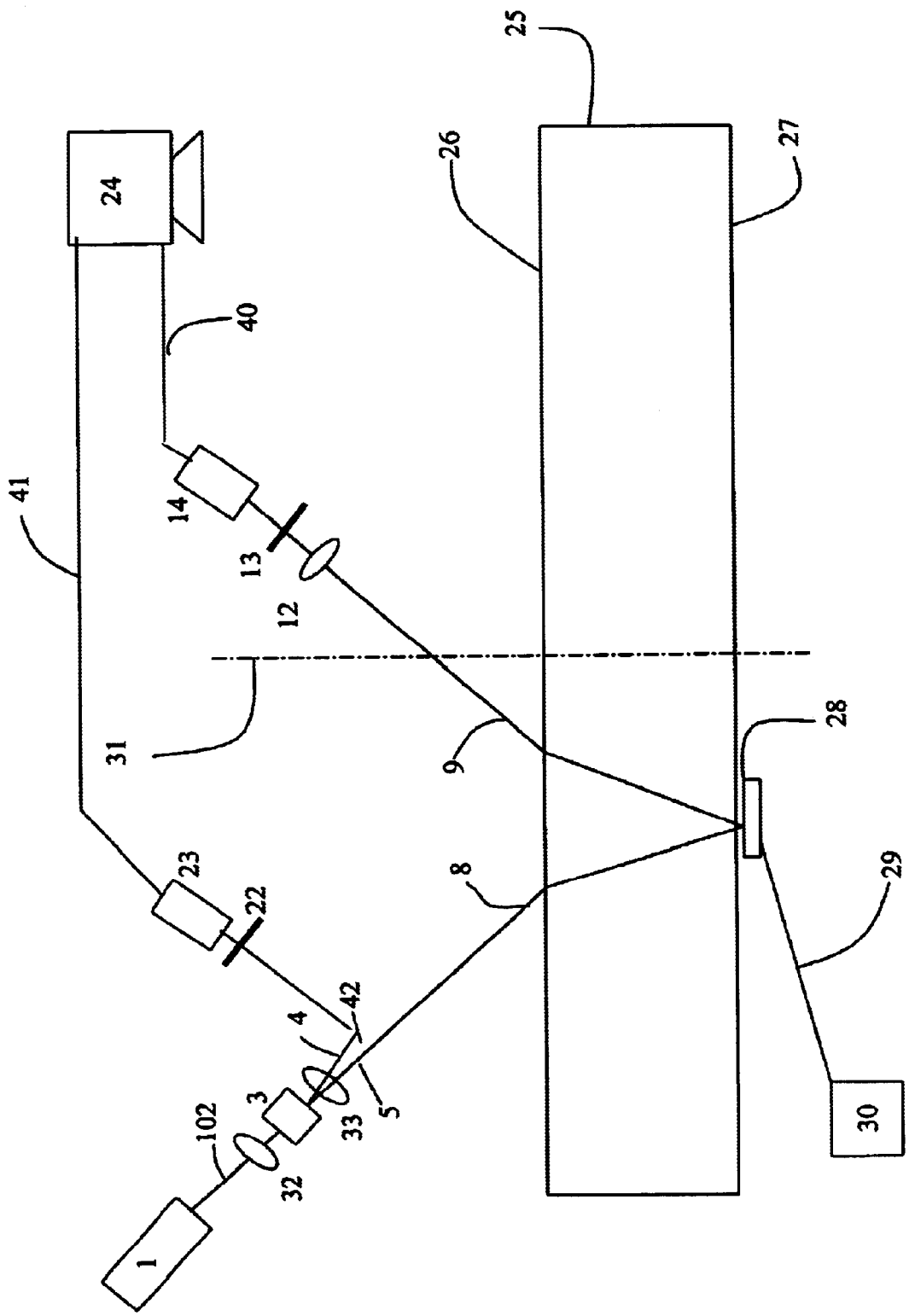
FIG. 13 is a drawing showing a preferred embodiment of the invention setup to measure the distance of a flat object surface with respect to the surface of a rotating transparent disk using a collimated and stationary micro-sized scanning measurement beam and a micro-sized reference beam taken directly from the light source.

Referring to FIG. 13, beam 102 passes through collimating lens 32 and is incident on the acousto-optical deflectors. The zero order beam 4 of deflector 3 is deflected by mirror 42 and it is used as reference beam. The two orthogonal polarized components of beam 4 are made to interfere by passing through polarizer 22. The interfrometric signal 41 detected by photodetector 23 is sent to phasemeter 24. Signal 41 is used as reference signal. Referring to FIG. 9B the acousto optic deflector 3 is placed in-between two focusing or collimating lenses such that the distance between the two focusing lenses 32 and 33 is equal to the sum of the focal length of the lens 32 and 33. The scan field can be increased by either placing the acousto optic deflector 3 close to the lens 32, or by using large focal lengths for lenses 32 and 33. This optical system will produce collimated and parallel scanning beams 8 in X and Y directions. Beam 8 is incident on the disk surface 26 at oblique angle $\theta$. The S and P polarization components of the beam 8 are split at disk surface 27. The P polarization component is reflected back by the ABS of the slider, and the S polarization component of beam 8 is reflected back by disk surface 27. The two reflected polarization beam remix, when they are refracted by disk surface 26 into beam 9, since the measured spacing is very small. The two orthogonally polarized components of beam 9 are made to interfere by passing through a polarizer 13. Lens 12 will focus the scanning beam 9 into the photo-detector 14. The interferometric signal 40, measurement signal detected by photodetector 14, is sent into phasemeter 24.

Figure 14:
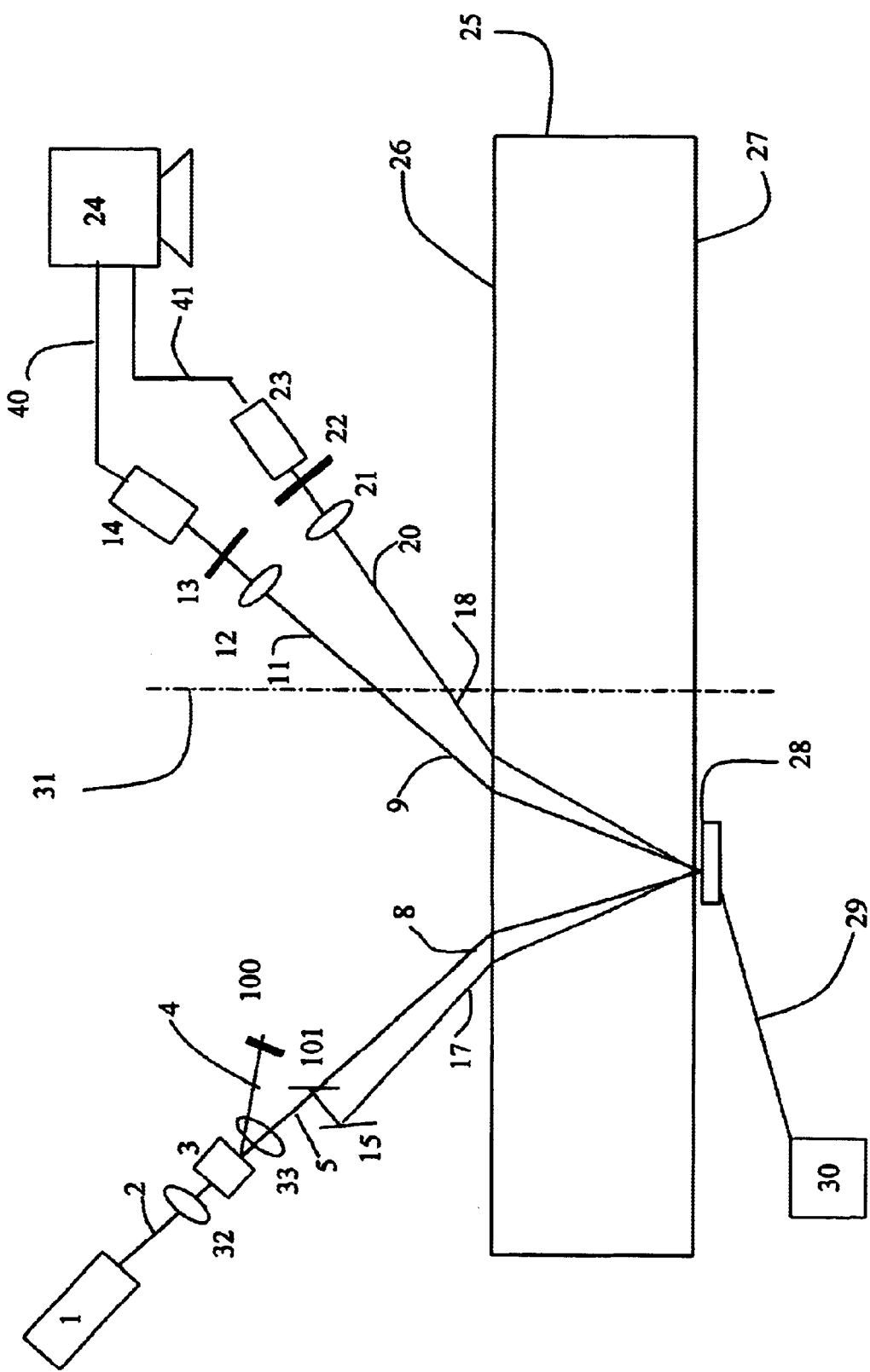
FIG. 14 is a drawing showing a preferred embodiment of the invention setup to measure the distance of a flat object surface with respect to the surface of a rotating transparent disk using a collimated and scanning micro-sized measurement beam and a micro-sized reference beam, which strike the bottom surface of the glass disk or the object surface at the same point but at a different angle.

Referring to FIG. 14, beam 102 pass through collimating lens 32 and is incident on acousto-optical deflector 3. Blocking means 100 blocks the zero order beam 4 from the deflector 3. The first order beam 5 passes through collimating lens 33. Collimating lens 33 and collimating lens 32 have the same focal length. Lenses 32 and 33 and deflector 3 are placed according to the focal length of the lenses 32, 33. The combination of collimating lens 32, acousto-optical deflector 3 and collimating lens 33 provides a parallel scanning beam 5, as shown in FIG. 9B. Beam 5 passes through a non-polarizing beam splitter 101, which divides the scanning beam 5 into two beams, beam 8 and beam 15, with either equal or different intensity. Beam 8 is incident an the disk surface 26 at oblique angle $\theta$. The S and P polarization components of the beam 8 are split at disk surface 27. The P polarization component is reflected back by the ABS of slider and S polarization component of beam 8 is reflected back by disk surface 27. The two reflected polarization beams merge when they are refracted by disk surface 26 into beam 9, since the measured spacing is very small. Lens 12 focuses the scanning beam 9 into the photodetector 14. The two orthogonally polarized components of beam 9 are made to interfere by passing through a polarize or analyzer 13. The interferometric signal 40, measurement signal detected by the photodetector 14, is sent into phasemeter 24. The zero order beam 4 is blocked by beam blocking mechanism 100. Mirror 42 directs the reference beam 15 into transparent disk 25, striking the disk surface 26 at an angle $\phi$ (beam 17). Angle $\phi$ is slightly larger or less than the oblique angle $\theta$. Therefore, beam 17 will be completely reflected back at disk surface 27 or the surface 28 of the object, instead of being split into two polarization beams as happens to the beam 8 which is incident on disk surface 26 at oblique angle $\theta$. Lens 20 focuses the scanning beam 9 into the photo-detector 23. The two orthogonally polarized components of beam 18 are made to interfere by passing through polarizer or analyzer 22. The interferometric signal 41, the reference signal detected by photodetector 23, is sent to phasemeter 24.

Second Embodiment of the Present Invention

Figure 16:
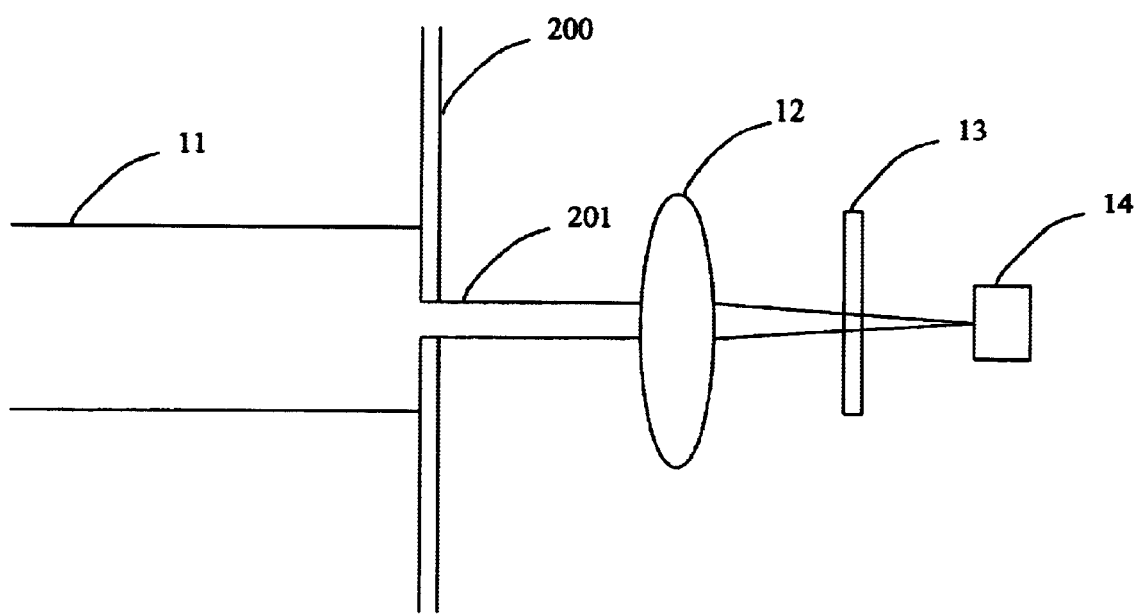
FIG. 16 is a drawing showing the method to measure the vibration of a smaller portion of the focused beam on the object by using a diaphragm or slit.

The second embodiment of the present invention increases the resolution of the system without reducing the spot size of the focused beam on the object. Referring to FIG. 16, the measurement beam 11 passes through a diaphragm or slot 200, which allows only a certain portion of the beam 11 to pass through and the rest of the beam is blocked. A small portion of the measurement beam 201 is focused on the measurement photo detector 14 by the focusing lens 12 after passing through an analyzer or polarizer 13. A smaller size for slot 200 will result in higher resolution for the system. By this method, a portion of the object smaller than the focal spot size of the beam can be measured. For example, if the focal spot size on the object is 10 micrometer and the collimated beam size of the beam 11 is 10 mm, the photo detector measures the average of the entire focused spot on the object. In order to measure the 1-micrometer area of the object by using 10 micrometer focused spot size, only 1 mm of the collimated beam 11 will pass through the diaphragm, and the rest of the beam will be blocked. In this case, the photodetector provides the average of 1-micro meter on the object, which corresponds to the 1 mm of the beam 11 passing through the diaphragm 200. With this method, the resolution of the object area to be measured can be increased without reducing the focal spot size of the beam on the object.

We claim:

1. A system for high speed and precision measurement of the distance between at least two near contact surfaces, one of which is an optically transparent element and the other is a substantially non-transparent element using heterodyne interferometry, comprising:

a laser source, which produces an output having two superimposed orthogonally polarized beams having S and P polarization, with a frequency difference between them;

means for splitting the polarized beams into measurement and reference beams without altering the characteristics of the polarized beams;

means for scanning the output of the laser source in both X and Y axes using an acousto optic deflector, wherein the two superimposed orthogonally polarized beams from the laser source enter the acoustic crystal of acoustic optic deflector Bragg's angle which produces a first order scanning beam and a zero order beam, both containing the two orthogonally polarized beams;

means for causing the reference beams to interfere;

a reference photo detector for detecting the reference beams and providing a reference signal;

means for causing the measurement beam to strike the object of interest at an oblique angle after passing through a glass plate having a polarization coating on the bottom surface close to the object of interest, the oblique angle is such that the S polarization of the incident beam is reflected from the bottom surface of the polarization coated glass plate and the P polarization refracts through the glass plate, the P polarization reflects from the substantially non-transparent object of interest and refracts to the glass plate;

means for causing the reflected S and P polarization beams from the bottom surface of the glass plate and the surface of the object respectively to interfere;

a measurement photo detector for detecting the measurement beams and providing a measurement signal; and means for determining the distance between the bottom surface of the glass plate and the object surface based on the phase difference between the measurement and reference signals from the measurement and reference photo detectors.

2. A system according to claim 1, wherein the laser source which produces two superimposed orthogonally polarized beams having a frequency difference between them includes a Zeeman laser source.

3. A system according to claim 1, wherein the laser source which produces two superimposed orthogonally polarized beams having a frequency difference between them includes an acousto optic modulator to produce two orthogonally polarized beams of a frequency difference equal to the center frequency or carrier frequency of the acoustic wave in the acousto optic modulator, and combining the orthogonally polarized beams from the acousto optic modulator having a frequency difference by using optical components.

4. A system according to claim 1 which further includes means for spatially filtering and expanding the laser output using a spatial filter including focusing optics and a pin hole depending on the beam expansion ratio and the quality of the required beam.

5. A system according to claim 1 which further includes means for focusing the scanning beam on a flat plane by using a lens.

6. A system according to claim 5 which further includes means for scanning beams parallel to one another and for focusing the beams on a flat plane at a predetermined distance, and means for positioning a scanning lens in the reflected beam path at a distance equal to the back working distance of the scanning lens from the object surface; and means for positioning the measurement photo detector at distance equal to the forward working distance of the scanning lens from the scanning lens on the reflected beam path.

7. A system according to claim 5 which further includes means for scanning the beams parallel to one another and to focus the beams on a flat plane at a predetermined distance; means for positioning a focusing lens in the reflected beam path at a distance equal to the focal length of the focusing lens from the object surface; and means for positioning the measurement photo detector at distance equal to the focal length of the focusing lens from the focusing lens on the reflected beam path.

8. A system according to claim 1 which further includes means for spatially filtering the beam using fiber optics including focusing the beam on to fiber optics and collimating the output beam from the fiber optics using a lens.

9. A system according to claim 8 which further includes means to produce a collimated beam in the range of few micro meter in diameter by using micro collimating lens.

10. A system according to claim 8 for measuring the optical gap between two surfaces, one of which is transparent, which further includes means for scanning beams parallel to one another by positioning the acousto optic deflector between two focusing lens such that, the distance between the two focusing lens is equal to the sum of their focal lengths, and the scanning area is increased or decreased by varying the focal length of the two focusing lenses and by positioning the acousto optic deflector closer to or away from the first focusing lens in the direction of the beam.

11. A system according claim 10 which further includes means for obtaining the reference signal from the zero order beam from the acousto optic deflector or by splitting the scanning beam using a non-polarizing bean splitter and directing the beam on to the bottom surface or surface of the object at an oblique angle such that both the S and P polarized beams get reflected from the bottom surface of the glass disk or from the surface of the object.

12. A system according to claim 11 which further includes means for detecting the optical gap between the bottom surface of the glass disk and the slider head by comparing the phase shift between the reference interference signal and measurement interference signal from the reference and measurement photo detectors respectively by heterodyne interferometric measurement; the displacement is calculated from the formula:

$$\Delta\phi = \left(\frac{2\pi}{\lambda}\right) 2h \cos\theta$$

where h is the spacing between disk surface and ABS of slider, $\theta$ is the incident angle of the measurement beam, $\lambda$ is the wavelength of the laser beam, and $\Delta\phi$ is the phase change between the measurement and the reference signal.

13. A system according to claim 11 which further includes means for obtaining the pitch and roll angle at any time by directing three measurement beams on to the slider and the angle is measured by comparison of the independent measurement signal to the common reference signal.

14. A system according to claim 11 which further includes means for analyzing a smaller portion of the focused beam spot on the object; wherein the focused beam spot on the object can be measured by allowing only a certain portion of the interfered beam to strike the photo detector window using a diaphragm or slot before the photo detector.

15. A method for high speed and precision measurement of the distance between at least two near contact surfaces, one of which is an optically transparent element and the other is a substantially non-transparent element using heterodyne interferometry, comprising:

producing with a laser source, an output having two superimposed orthogonally polarized beams having S and P polarization, with a frequency difference between them;

splitting the polarized beams into measurement and reference beams without altering the characteristics of the polarized beams;

scanning the output of the laser source in both X and Y axes using an acousto optic deflector, wherein the two superimposed orthogonally polarized beams from the laser source enter the acoustic crystal of acoustic optic deflector at Bragg's angle which produces a first order scanning beam and a zero order beam, both containing the two orthogonally polarized beams;

causing the reference beams to interfere;

detecting with a reference photo detector the reference beams and providing a reference signal;

causing the measurement beam to strike the object of interest at an oblique angle after passing through a glass plate having a polarization coating on the bottom surface close to the object of interest, the oblique angle is such that the S polarization of the incident beam is reflected from the bottom surface of the polarization coated glass plate and the P polarization refracts through the glass plate, the P polarization reflects from the substantially non-transparent object of interest and refracts to the glass plate;

causing the reflected S and P polarization beams from the bottom surface of the glass plate and the surface of the object respectively to interfere;

detecting with a measurement photo detector the measurement beams and providing a measurement signal; and determining the distance between the bottom surface of the glass plate and the object surface based on the phase difference between the measurement and reference signals from the measurement and reference photo detectors.

16. A method according to claim 15, wherein the laser source which produces two superimposed orthogonally polarize beams having a frequency difference between them includes a Zeeman laser source.

17. A method according to claim 15, wherein the laser source which produces two superimposed orthogonally polarized beams having a frequency difference between them includes an acousto optic modulator to produce two orthogonally polarized beams of a frequency difference equal to the center frequency or carrier frequency of the acoustic wave in the acousto optic modulator, and combining the orthogonally polarized beams from the acousto optic modulator having a frequency difference by using optical components.

18. A method according to claim 15 which further includes spatially filtering and expanding the laser output using a spatial filter including focusing optics and a pin hole depending on the beam expansion ratio and the quality of the required beam.

19. A method according to claim 15 which further includes focusing the scanning beam on a flat plane by using a lens.

20. A method according to claim 19 further includes scanning beams parallel to one another and for focusing the beams on a flat plane at a predetermined distance, and positioning a scanning lens in the reflected beam path at a distance equal to the back working distance of the scanning lens from the object surface; and positioning the measurement photo detector at distance equal to the forward working distance of the scanning lens from the scanning lens on the reflected beam path.

21. A method according to claim 19 which further includes scanning the beams parallel to one another and to focus the beams on a flat plane at a predetermined distance; positioning a focusing lens in the reflected beam path at a distance equal to the focal length of the focusing lens from the object surface; and positioning the suet photo detector at distance equal to the focal length of the focusing lens from the focusing lens on the reflected beam path.

22. A method according to claim 15 which further includes spatially filtering the beam using fiber optics including focusing the beam on to fiber optics and collimating the output beam from the fiber optics using a lens.

23. A method according to claim 22 further includes means to produce a collimated beam in the range of few micro meter in diameter by using micro collimating lens.

24. A method of measuring the optical gap between two surfaces, one of which is transparent in accordance to claim 22 which further includes scanning beams parallel to one another by positioning the acousto optic deflector between two focusing lens such that, the distance between the two focusing lens is equal to the sum of their focal lengths, and the scanning area is increased or decreased by varying the focal length of the two focusing lenses and by positioning the acousto optic deflector closer to or away from the first focusing lens in the direction of the beam.

25. A method according claim 24 which further includes obtaining the reference signal from the zero order beam from the acousto optic deflector or by splitting the scanning beam using a non-polarizing bean splitter and directing the beam on to the bottom surface or surface of the object at an oblique angle such that both the S and P polarized beams get reflected from the bottom surface of the glass disk or from the surface of the object.

26. A method according to claim 25 which further includes detecting the optical gap between the bottom surface of the glass disk and the slider head by comparing the phase shift between the reference interference signal and measurement interference signal from the reference and measurement photo detectors respectively by heterodyne interferometric measurement; the displacement is calculated from the formula:

$$\Delta\phi = \left(\frac{2\pi}{\lambda}\right)2h\cos\theta$$

where h is the spacing between disk surface and ABS of slider, θ is the incident angle of the measurement beam, λ is the wavelength of the laser beam, and Δφ is the phase change between the measurement and the reference signal.

27. A method according to claim 25 which further includes obtaining the pitch and roll angle at any time by directing three measurement beams on to the slider and the angle is measured by comparison of the independent measurement signal to the common reference signal.

28. A method according to claim 25 which further includes analyzing a smaller portion of the focused beam spot on the object; wherein the focused beam spot on the object can be measured by allowing only a certain portion of the interfered beam to strike the photo detector window using a diaphragm or slot before the photo detector.

* * * * *